United States Patent [19]

Douglas et al.

[11] 4,212,322

[45] Jul. 15, 1980

[54] LINEAR VACUUM PROGRAMMER

[75] Inventors: Paul M. Douglas, St. Charles; Andrew A. Kenny, Roselle, both of Ill.

[73] Assignee: Eaton Corporation, Cleveland, Ohio

[21] Appl. No.: 4,439

[22] Filed: Jan. 18, 1979

Related U.S. Application Data

[63] Continuation of Ser. No. 754,654, Dec. 27, 1976, abandoned.

[51] Int. Cl.² ............................................. F16K 11/06
[52] U.S. Cl. ................................ 137/625.48; 137/884
[58] Field of Search ...................... 137/625.48, 625.69, 137/269, 884; 251/324, 367; 165/31

[56] References Cited

U.S. PATENT DOCUMENTS

| 1,157,215 | 10/1915 | Gille | 251/324 |
|---|---|---|---|
| 3,503,377 | 3/1970 | Beatenbough et al. | 251/324 X |
| 3,590,874 | 7/1971 | Rice | 137/625.48 |
| 3,680,593 | 8/1972 | Sorenson | 251/324 X |
| 3,819,152 | 6/1974 | Clippard | 137/625.48 X |
| 3,951,115 | 4/1976 | Brisko | 123/117 A |
| 3,983,930 | 10/1976 | Franz | 165/31 |
| 4,026,325 | 5/1977 | Loveless | 137/625.26 |

Primary Examiner—William R. Cline
Attorney, Agent, or Firm—R. J. McCloskey; E. C. Crist; R. A. Johnston

[57] ABSTRACT

This invention discloses a linear programmer for controlling parts of a servo system by a fluid pressure. The programmer comprises a first body with a longitudinal bore. A second body is joined to the first body forming a manifold therebetween. Apertures in the first body provide fluid communication between the bore and manifold. A plunger is disposed so as to be longitudinally movable within the bore to connect and disconnect the manifold to a source of sub-atmospheric fluid pressure to thereby activate the parts of the system.

6 Claims, 3 Drawing Figures

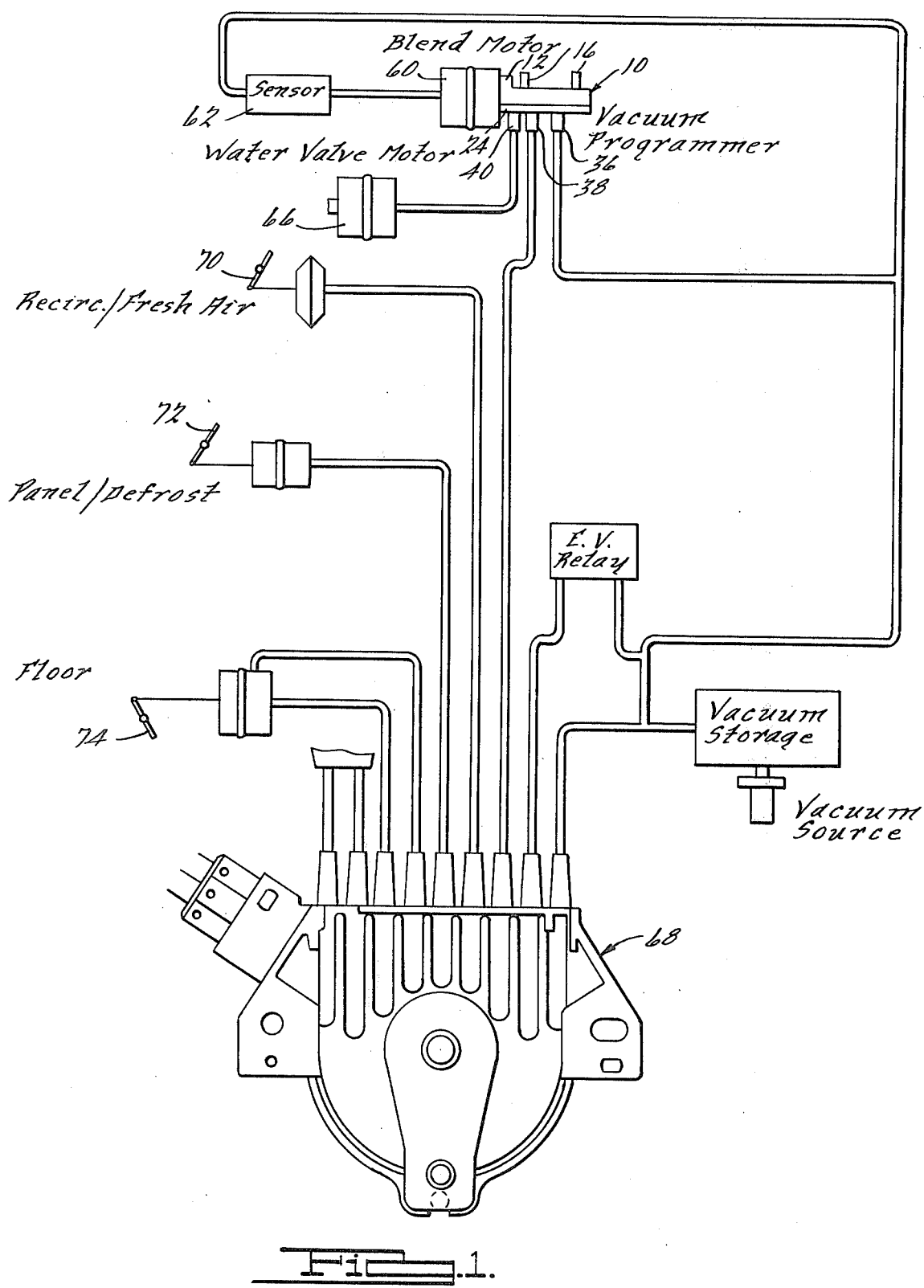

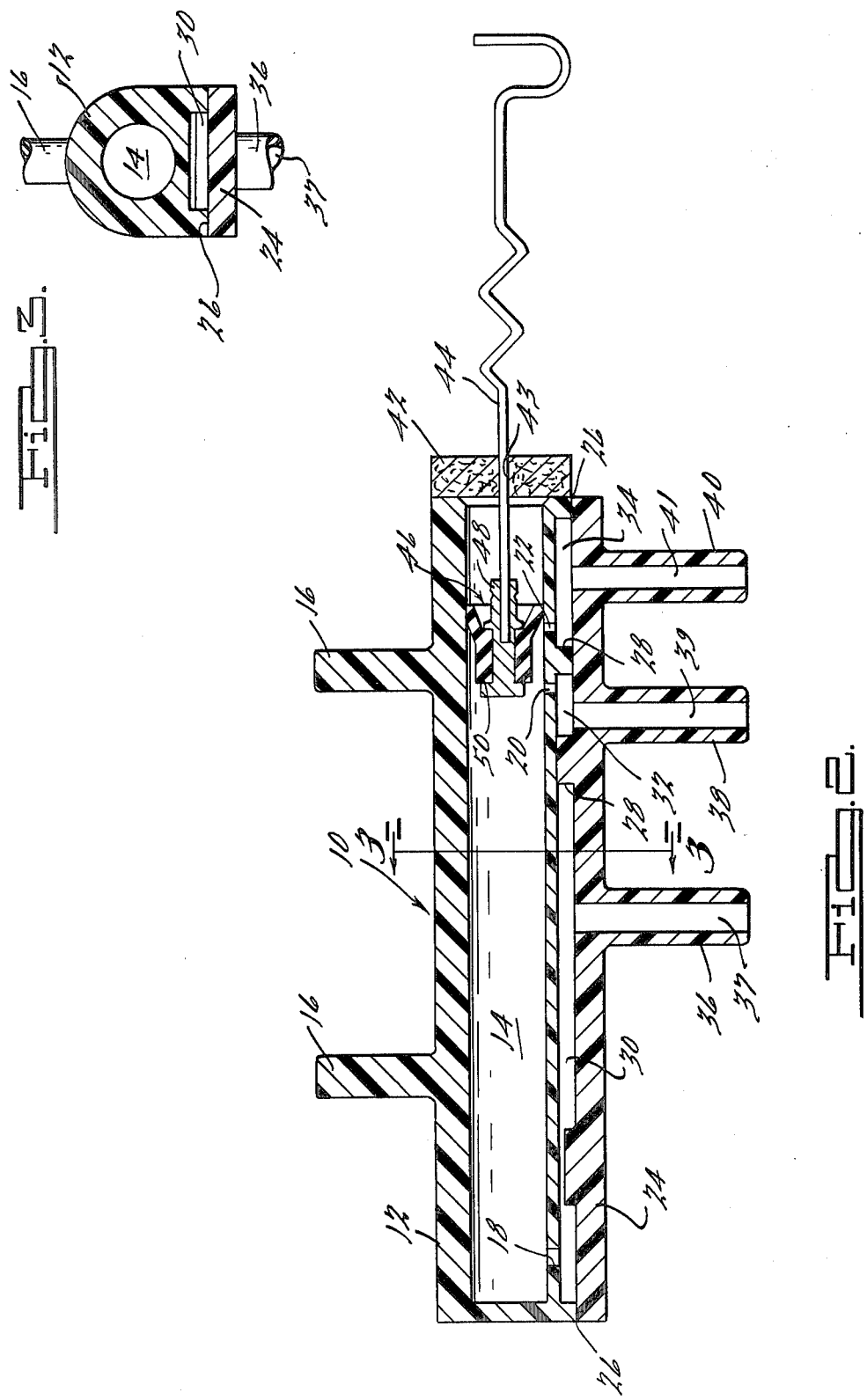

LINEAR VACUUM PROGRAMMER

This is a continuation of application Ser. No. 754,654 filed Dec. 27, 1976, now abandoned.

BACKGROUND OF THE INVENTION

1. Field of the Invention

In one aspect, this invention relates to vacuum control valves. In a further aspect, this invention relates to servo-controlled vacuum programmers.

2. Prior Art

Linear vacuum programmers or diverters are known in the art. One example is shown in U.S. Pat. No. 3,983,930 issued to Rudolph J. Franz. This patent shows a linear diverter valve with an elongated body and a bore extending longitudinally therein. A plurality of ports are axially spaced along the body and are in fluid communication with the bore. A diverter valve assembly is mounted within the bore; the diverter valve has sealing means at each end which seal the bore. The diverter valve also has a reduced center section which allows fluid flow within the bore between the two sealing means. Therefore, any ports which lie between the sealing means will be in fluid communication with each other. As the two sealing means are moved longitudinally along the bore, selected ports can be interconnected by means of the reduced portion of the valve.

A problem arises with the prior art devices in assembling the valve in a system. Where a plurality of devices are to be controlled by the programmer, a number of port-connecting nipples are placed on the valve body. The ports and nipples are placed in proximity and, therefore, the ports are spaced about the same distance apart as the nipples. This has created a problem in that the size of the programmer has been determined by the port spacing which in turn has been dictated by the size of the port-connecting nipples.

SUMMARY OF THE INVENTION

It is an object of this invention to provide a linear programmer where the ports, or switch points, are relatively close together and the nipples for attaching ports to the programmer are spaced further apart than the ports.

In general, the programmer of this invention has a first body portion having an inlet port connected to a source of fluid pressure. The first portion body has a longitudinal bore therein and at least one control or valving aperture. A second body portion defines a manifold which is in fluid communication with the bore via the aperture. The manifold generally has means associated therewith to attach a device to be operated by the fluid pressure. A valve plunger is slidably mounted within the bore. The valve plunger can be moved within the bore so as to expose the control aperture to normal atmospheric pressure or to the operating fluid pressure maintained at the inlet port.

As a further feature of this invention, the first body portion may have two or more, i.e., a plurality of ports or apertures longitudinally disposed along the first body portion. In such an arrangement, each of the apertures provides operating fluid pressure to a separate device and would generally have its own separate through manifold chamber. The manifold chambers thus permit the port apertures to be closely spaced for convenience of valving, yet permit the port connection nipples to be spaced apart to permit ease of installation.

As yet a further feature, the movable plunger of this invention is provided with a single circumferential sealing lip disposed about a core. The seal is in sliding contact with the bore and provides an effective seal against the inner periphery of the bore.

BRIEF DESCRIPTION OF THE DRAWINGS

In the accompanying drawing:

FIG. 1 is a diagrammatic view of a linear programmer of this invention installed in an automotive air conditioning system;

FIG. 2 is a section view of the linear programmer of FIG. 1; and

FIG. 3 is a section view taken along section-indicating lines 3—3 of FIG. 2.

DESCRIPTION OF THE PREFERRED EMBODIMENT

The linear programmer 10 shown in FIG. 2 will be described with reference to its function in an automotive heating and air conditioning system such as that shown in FIG. 1. The linear programmer comprises a first body portion 12 which has a longitudinal bore 14 therein. The first body portion 12 has a pair of upstanding solid studs 16 which can be used to attach the programmer to the vehicle mounting structure. A plurality of port apertures 18, 20 and 22 are provided in the first body portion for communicating with the bore 14.

A second body portion 24 defines a manifold communicating with apertures 18, 20 and 22. The body portion 24 is preferably a separate member and is sealed to the first body member 12 along a seam 26 to create a pressure tight seal. The manifold is divided into separate chambers preferably by two projections 28 provided on the first body member thereby creating three manifold chambers 30, 32 and 34 between the body portions. Three nipples 36, 38 and 40 are provided for the manifold chambers and extend radially outward from the second body portion, thereby providing means to attach the programmer to external parts of the system. The nipples define, respectively, ports 37, 39 and 41, each communicating with a separate chamber or portion of the manifold.

In the embodiment of the invention illustrated in FIG. 2, the nipples are spaced such that port 37 connects to chamber 30, port 39 connects to chamber 32, and port 41 connects to chamber 34. In the presently preferred practice, the body portions 12 and 24, as mentioned above, are formed of separate members and preferably of plastic material. With reference to FIG. 3, the second body portion 24 mates with the first body portion 12 at a parting line, denoted 26, to typically form manifold chambers 30, 32 and 34, with only manifold chamber 30 being shown in FIG. 3 for clarity and simplicity. The first and second body portions 12 and 24 are joined along parting line 26 in a fluid pressure tight seal in any suitable manner, as for example by adhesives. However, the technique of weldment by fusion using ultrasonic waves has been found particularly suitable and is the preferred method of joining the two body portions. It will be understood, however, that the first and second body portions could be formed by other arrangements, as for example, by molding the programmer in halves about a vertical line of symmetry in FIG. 3 and thereafter joining the halves, or by molding the portions integrally as a one-piece unit.

A cap 42, preferably formed of foam material, is attached to one end of the first body member 12 to partially close bore 14. An aperture 43 provided in cap 42 allows a wire 44 to pass into the bore. A plunger 46 is slidably disposed in the bore 14, and has one end of wire 44 connected thereto for effecting movement of the plunger. The plunger 46 has a core 48 and a radially resilient circumferential seal 50 provided therearound. Movement of the wire thus causes movement of the plunger and seal 50 which connects and disconnects apertures 20 and 22 successively fluidly to the bore 14. The wire 44 can be moved by various means, a solenoid being a preferred means.

In operation, as shown, fluid pressure and typically a vacuum is supplied to nipple 36, manifold 30 and to bore 14 via aperture 18. As a result, bore 14 from its end wall nearest aperture or inlet 18 to the plunger 46 is constantly maintained at a reduced pressure. The apertures 20 and 22 are preferably located at a location in the first body portion 12 most remote from the inlet aperture 18, and are closely spaced for quick valving with minimal movement of plunger 46. Manifolds 32 and 34 are thus shaped so as to permit greater spacing between nipples 38 and 40 for ports 39, 41 than the spacing between ports 20 and 22. For example, in the presently preferred embodiment the apertures 20 and 22 are spaced about 1/32 of an inch apart while the nipples are spaced 3/10 of an inch apart. This configuration allows easy switching or valving of ports 20, 22 and yet permits easy assembly. As a further refinement, the ports 20, 22 can be disposed in the lower wall of body member 12 at an angle. If the ports are disposed at a converging angle, the portions of the ports at the base 14 can be closer together than the portions of the ports at the manifolds 32, 34. This allows an even greater spacing differential between the valving ports 20, 22 and the nipples.

To provide a further understanding of the linear programmer's operation, FIG. 1 shows a typical automotive air conditioning system with the programmer 10 shown installed in the system.

In general, such systems have a housing (not shown) containing a plenum which is mounted in the vehicle. The plenum is defined by a plurality of ducts which can be opened or closed in predetermined sequences to feed heated, cooled, blended or fresh air into the passenger compartment. A blower is normally associated with the plenum to move the air into the passenger compartment. The exact plenum and blower arrangement is dictated by design considerations of the vehicle to which the plenum is attached.

In the system shown in FIG. 1, a multifunctional blend servomotor 60 is in vacuum connection with a temperature sensor 62 so that changes in temperature will cause sensor 62 to vary a vacuum signal to servomotor 62 to activate the blend motor. The servomotor 60 has output actuator thereof operatively connected to the wire 44 of linear programmer 10 for moving the plunger 46 to cover and uncover apertures 20 and 22.

In the system of FIG. 1, the linear programmer 10 ports vacuum to a vacuum operated water valve servomotor 66 which controls a flow of heater water through a heater core in response to vacuum signal from port 40.

Nipple 38 is connected by a vacuum line to a selector or distributor 68 which is used to set the desired cycle of heating and air conditioning. The selector 68 in combination with the linear programmer 10 controls flow directing doors which direct air flow within the plenum.

In general, the doors 70, 72 function in a manner well known in the art. The recirculating fresh air door 70 controls the circulation of air into the plenum from outside the vehicle or from the passenger compartment. A temperature blend door, not shown, controls a flow of blended air within the plenum and a by pass door, not shown, controls the flow of cooled air through the plenum. The blend door and by pass door are controlled by the blend servomotor 60.

A panel/defrost door 72 governs the flow of heated or cooled air to the defrosters or air conditioning panels and a floor door 74 controls the flow of conditioned air to upper or lower parts of the vehicle passenger compartment.

The workings of the automotive air conditioning system are well known to those skilled in the art, and a detailed explanation is omitted in the interest of brevity. Further detailed description of such systems can be found in U.S. Pat. No. 3,983,930 issued to Franz, especially columns 3–10, and U.S. Pat. No. 3,856,045 issued to Kenny, Et Al, especially columns 3–8.

Various modifications and alterations to this invention will become obvious to those skilled in the art without departing from the scope and spirit of this invention. It is understood that this invention is not limited to the illustrative embodiments set forth hereinbefore, but is limited only by the following claims:

What is claimed is:

1. A linear programmer for controlling various parts of a system by fluid pressure, comprising:
   (a) body means including means defining a first body portion having a longitudinal bore therein, said first body portion having at least two valving apertures extending through said first body portion and fluidly communicating with said bore, said apertures being spaced longitudinally with respect to said bore a first distance;
   (b) said body means including means defining a second body portion attached to said first body portion along a parting line, said first and second body portions having adjacent surfaces, said surfaces defining a plurality of longitudinally extending manifold chambers disposed intermediate said first and second body portions and exteriorly of said bore, each of said valving apertures providing fluid communication between said bore and one of said manifold chambers;
   (c) said second body portion defining at least two fluid ports, said fluid ports being spaced longitudinally relative to said bore a second distance substantially greater than said first distance, each of said fluid ports being in fluid communication with one of said manifold chambers such that said valving apertures are located intermediate said fluid ports; and
   (d) plunger means movable within said bore and in sealing contact therewith, said plunger means operative to valve said apertures from one side of said plunger means to the other side thereof by moving an amount less than said second distance and greater than said first distance.

2. The programmer of claim 1, wherein said plunger is provided with a single sealing lip circumferentially disposed about a core, said lip being in sliding contact with the wall of said bore.

3. The programmer defined in claim 1, wherein said manifold chambers and said fluid ports are circumferentially aligned with respect to a longitudinal axis through said bore.

4. A linear valve for valving a plurality of fluid lines, comprising:
- (a) a first body member having a longitudinal bore therein, said first body defining a plurality of valving apertures fluidly communicating with said bore and spaced longitudinally therealong;
- (b) a second body member attached to said first body, along a substantially planar parting line, said first and second bodies defining a plurality of longitudinally extending manifold chambers therebetween, said manifold chambers being disposed exteriorly of said bore, each of said manifold chambers being in fluid communication with one of said valving apertures, each of said valving apertures being effective for fluidly communicating said bore with said respective manifold chamber;
- (c) said second body member defining a plurality of fluid ports for connection to said fluid lines, each of said ports fluidly communicating with only one of said manifold chambers, each of said fluid ports spaced longitudinally from its respective valving aperture; and
- (d) plunger means movable within said bore and in sealing contact therewith, said plunger means being operative upon positioning therein to selectively fluidly communicate said valving apertures on either side of said plunger means, said plunger means being effective for fluidly isolating said valving apertures on opposite sides thereof.

5. A valve as defined in claim 4, wherein said plunger means includes a plunger member provided with a single sealing lip circumferentially disposed about a core, said lip being in sliding contact with the wall of said bore.

6. A valve as defined in claim 5, wherein said manifold chambers and said fluid ports are circumferentially aligned with respect to a longitudinal axis through said bore.

* * * * *